(12) United States Patent
Zhu et al.

(10) Patent No.: US 12,256,347 B2
(45) Date of Patent: Mar. 18, 2025

(54) APPLYING ZERO ELEMENT BEAM IN SEARCH AND MEASUREMENT PROCEDURE FOR POWER SAVINGS IN MMW

(71) Applicant: QUALCOMM Incorporated, San Diego, CA (US)

(72) Inventors: Jun Zhu, San Diego, CA (US); Yongle Wu, San Diego, CA (US); Jafar Mohseni, San Diego, CA (US); Raghu Narayan Challa, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 209 days.

(21) Appl. No.: 17/238,098

(22) Filed: Apr. 22, 2021

(65) Prior Publication Data

US 2021/0345260 A1    Nov. 4, 2021

Related U.S. Application Data

(60) Provisional application No. 63/017,554, filed on Apr. 29, 2020.

(51) Int. Cl.
*H04W 56/00* (2009.01)
*H04W 24/10* (2009.01)
*H04W 52/52* (2009.01)
*H04W 76/28* (2018.01)

(52) U.S. Cl.
CPC ........ *H04W 56/001* (2013.01); *H04W 24/10* (2013.01); *H04W 52/52* (2013.01); *H04W 76/28* (2018.02)

(58) Field of Classification Search
CPC .................................................. H04W 56/001
See application file for complete search history.

(56) References Cited

U.S. PATENT DOCUMENTS

| | | | |
|---|---|---|---|
| 10,652,856 B2* | 5/2020 | Åström | H04B 7/0617 |
| 2017/0094624 A1* | 3/2017 | Balachandran | H04W 72/542 |
| 2019/0037509 A1* | 1/2019 | Li | H04W 56/001 |
| 2019/0045559 A1* | 2/2019 | Huang | H04B 17/318 |

(Continued)

FOREIGN PATENT DOCUMENTS

| | | |
|---|---|---|
| CN | 110622583 A | 12/2019 |
| WO | 2019022574 A1 | 1/2019 |

(Continued)

OTHER PUBLICATIONS

International Search Report and Written Opinion—PCT/US2021/028964—ISA/EPO—Aug. 24, 2021.

*Primary Examiner* — Guang W Li
(74) *Attorney, Agent, or Firm* — Procopio, Cory, Hargreaves & Savitch

(57) ABSTRACT

This disclosure provides systems, devices, apparatus and methods, including computer programs encoded on storage media, for applying a zero element beam to conserve power in search and measurement operations of a UE. The UE may determine to measure a set of SSBs, where each SSB of the set of SSBs is transmitted on four symbols, and further determine a subset of the SSBs for which less than the four symbols associated with the SSBs are to be used for measurement of the SSBs. The UE may measure each SSB of the subset of the SSBs through less than the four symbols associated with the SSB.

24 Claims, 11 Drawing Sheets

(56) References Cited

U.S. PATENT DOCUMENTS

| | | | |
|---|---|---|---|
| 2019/0297577 A1* | 9/2019 | Lin | H04W 52/0235 |
| 2019/0357159 A1* | 11/2019 | Pan | H04L 5/0053 |
| 2019/0364529 A1* | 11/2019 | Ko | H04W 72/04 |
| 2020/0015214 A1* | 1/2020 | Si | H04W 76/14 |
| 2020/0022185 A1* | 1/2020 | Luo | H04B 7/0695 |
| 2020/0076568 A1* | 3/2020 | Nguyen | H04L 7/042 |
| 2020/0275319 A1 | 8/2020 | Murray et al. | |
| 2020/0275406 A1* | 8/2020 | Shi | H04W 68/00 |
| 2020/0280940 A1* | 9/2020 | Kim | H04W 56/001 |
| 2020/0396744 A1* | 12/2020 | Xiong | H04B 7/088 |
| 2021/0014896 A1* | 1/2021 | Tang | H04B 7/0626 |
| 2021/0029657 A1* | 1/2021 | Liu | H04W 24/08 |
| 2021/0153162 A1* | 5/2021 | Chen | H04W 72/0453 |
| 2021/0185683 A1* | 6/2021 | Reial | H04L 5/0042 |
| 2021/0258902 A1* | 8/2021 | Gao | H04L 5/0048 |
| 2021/0345260 A1* | 11/2021 | Zhu | H04J 11/0069 |
| 2022/0264495 A1* | 8/2022 | Liu | H04W 72/0446 |
| 2022/0295464 A1* | 9/2022 | Ko | H04W 72/044 |
| 2023/0023515 A1* | 1/2023 | Si | H04W 72/0453 |

FOREIGN PATENT DOCUMENTS

| | | |
|---|---|---|
| WO | 2019032853 A1 | 2/2019 |
| WO | WO-2019095120 A1 | 5/2019 |
| WO | 2019138500 A1 | 7/2019 |

* cited by examiner

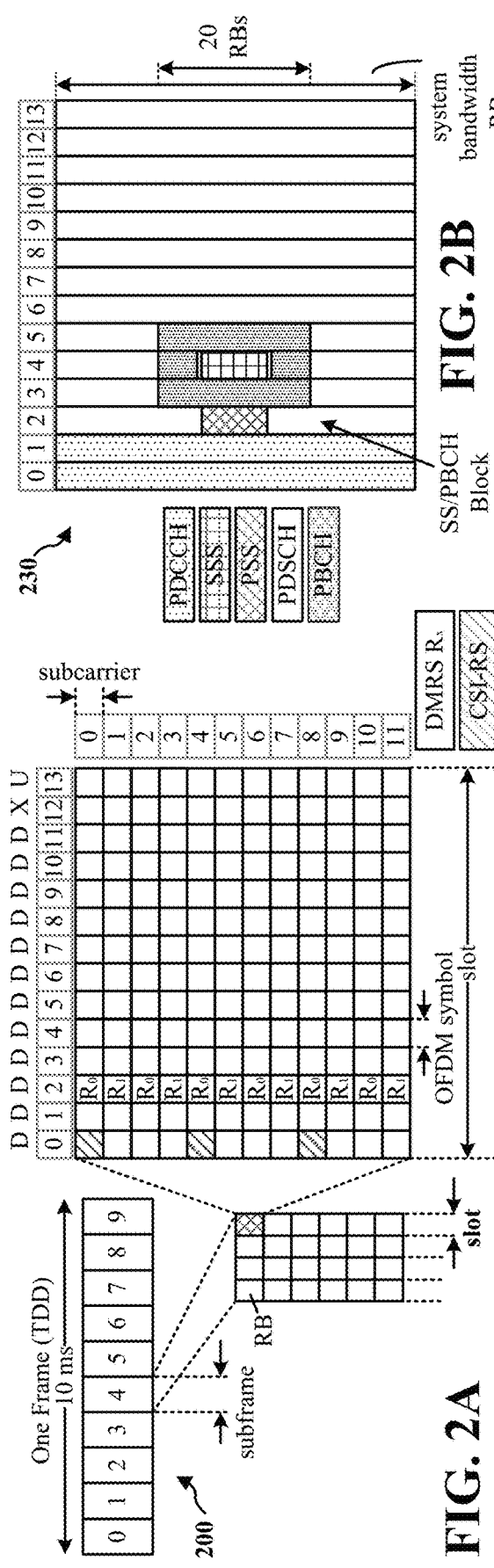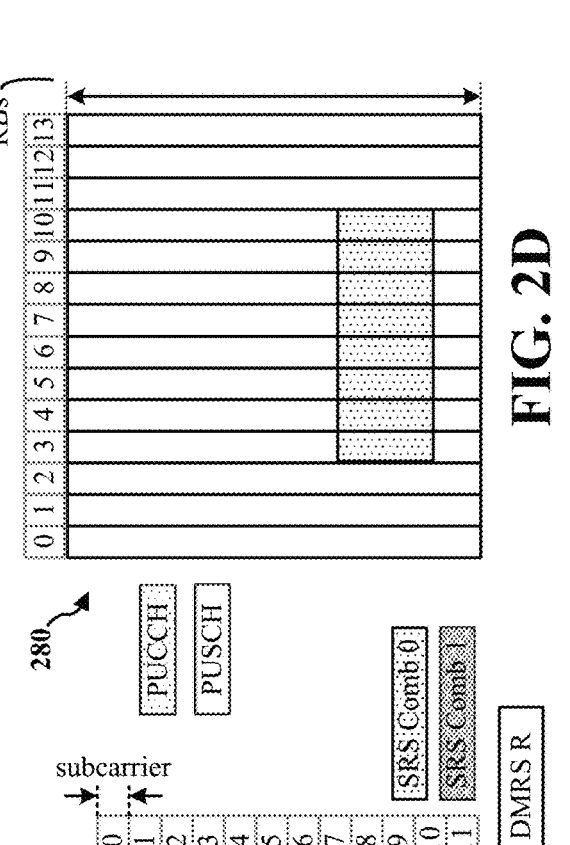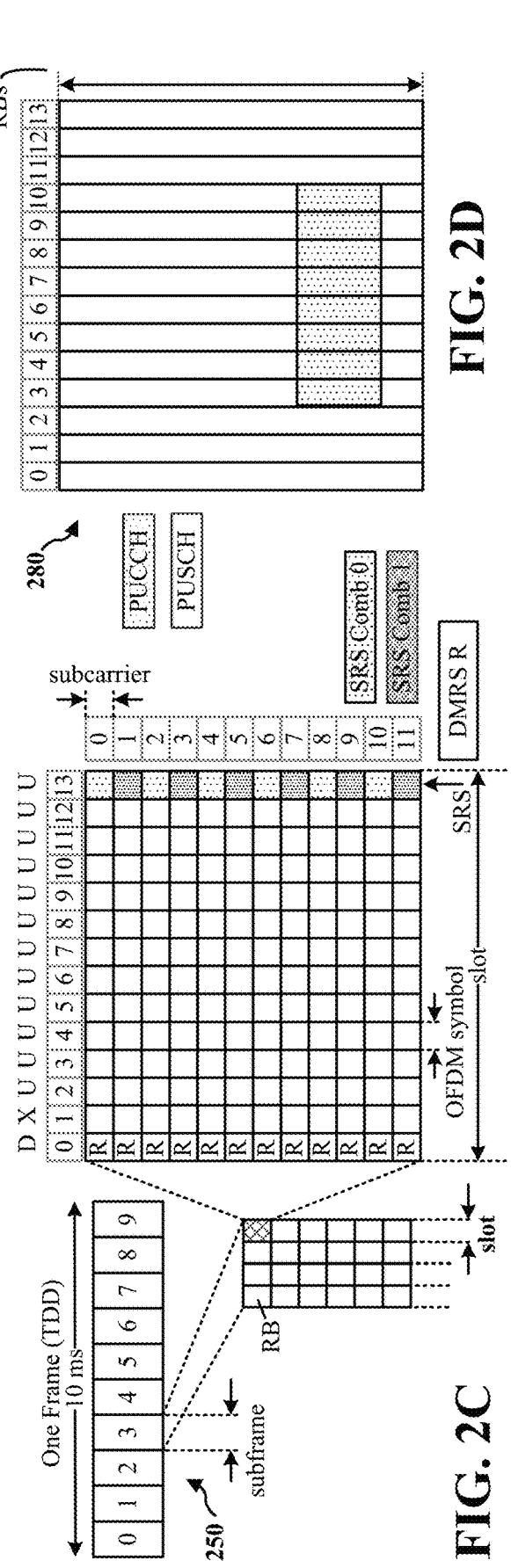

| Mode | Mode to Active Duration in ms | Active to Mode Duration in ms | RF Current Adder in mA |
|---|---|---|---|
| Active: 4-element beam | < CP | < CP | 188.4 |
| 0-element beam | < CP | < CP | 23 |

FIG. 5

| | CDRX ON or Connected without CDRX | CDRX OFF |
|---|---|---|
| SMTC | ZEB on unused SSB symbols within SSB bitmap | ZEB on unused SSB symbols |
| Non-SMTC | No ZEB (since unused symbols may be used for UL/DL data) | |

| USE CASES | NUMBER OF UTILIZED SYMBOLS PER SSB |
|---|---|
| Cell search | 4 (PSS+PBCH+SSS+PBCH) |
| Serving cell only measurement (including RLM/BFD tracking) | 1 (SSS) |
| Neighbor cell measurement | 3 (PBCH+SSS+PBCH) |
| TTL/FTL/AGC loop | 3 (PBCH+SSS+PBCH) |
| Undetected SSB | 0 |

700

| PSS | PBCH | SSS | PBCH | PSS | PBCH | SSS | PBCH |

———— SSB 1 ————  ———— SSB 2 ————

750

| | Number of SSB symbols (per 1ms) | Average current on RF (in mA) |
|---|---|---|
| Baseline | 64 | 107.66 |
| NoS: All SSB detected | 16 | 36.77 |
| LoS: 2 SSB detected | 2 | 16.10 |

FIG. 8

APPLYING ZERO ELEMENT BEAM IN SEARCH AND MEASUREMENT PROCEDURE FOR POWER SAVINGS IN MMW

CROSS REFERENCE TO RELATED APPLICATION

This application claims the benefit of U.S. Provisional Application Ser. No. 63/017,554, entitled "APPLYING ZERO ELEMENT BEAM IN SEARCH AND MEASUREMENT FOR POWER SAVING IN 5G NR MMW" and filed on Apr. 29, 2020, which is expressly incorporated by reference herein in its entirety.

BACKGROUND

Technical Field

The present disclosure relates generally to communication systems, and more particularly, to applying a zero element beam (ZEB) in a search and measurement procedure for power savings in 5G new radio (NR) millimeter wave (mmW).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eIBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a user equipment (UE) performs a cell search, the UE may monitor for respective synchronization signal blocks (SSBs) that correspond to a plurality of beams transmitted from a base station in a plurality of directions to measure a detected signal strength of the respective SSBs in each of the plurality of directions. The UE may report reception information to the base station, for example, based on whether each of the SSBs were received with a threshold signal strength, received with less than the threshold signal strength, or not received/undetected by the UE. By utilizing a same search/measurement technique for post-search operations, the UE may unnecessarily consume power by again listening for SSBs that were previously determined to be undetected by the UE during the cell search. Further, even for the SSBs that were detected during the cell search, some operations of the UE (e.g., serving cell measurements, neighbor cell measurements, etc.) may allow less than all the symbols of an SSB to be measured, such that power may be likewise unnecessarily consumed by performing measurements on all the symbols of the SSBs.

Accordingly, after the UE performs a cell search for a set of SSBs, the UE may determine a subset of the set of SSBs that is detected from the cell search. For subsequent measurement operations, the UE may conserve power by listening for/measuring only the SSBs that correspond to the subset of SSBs detected from the cell search and applying a ZEB to the SSBs that correspond to undetected SSBs from the cell search (e.g., SSBs that are outside the subset). Each SSB measured by the UE may be at least four symbols in duration. The UE may further determine based on a type of measurement operation to be performed that less than four symbols of an SSB may need to be measured. The UE may additionally conserve power by measuring less than four symbols of the SSB in the subset of SSBs based on the type of measurement operation, and apply the ZEB to the reaming symbol(s) of each SSB in the subset of SSBs.

In an aspect of the disclosure, a method, a computer-readable medium, and an apparatus are provided. The apparatus may be configured to determine to measure a set of SSBs, each SSB of the set of SSBs transmitted on four symbols; determine a subset of SSBs of the set of SSBs for which less than the four symbols associated with the SSBs are to be used for measurement of the SSB; and measure each SSB of the subset of the SSBs through less than the four symbols associated with the SSB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is a table that illustrates radio frequency (RF) power consumption for power modes of a UE.

FIG. 6 is a table illustrating application of a zero element beam (ZEB) in association with a SSB measurement timing configuration (SMTC) and connected-mode discontinuous reception (CDRX).

FIG. 8 is a table that illustrates RF power consumption corresponding to a number of measured SSB symbols.

DETAILED DESCRIPTION

Figure 1:
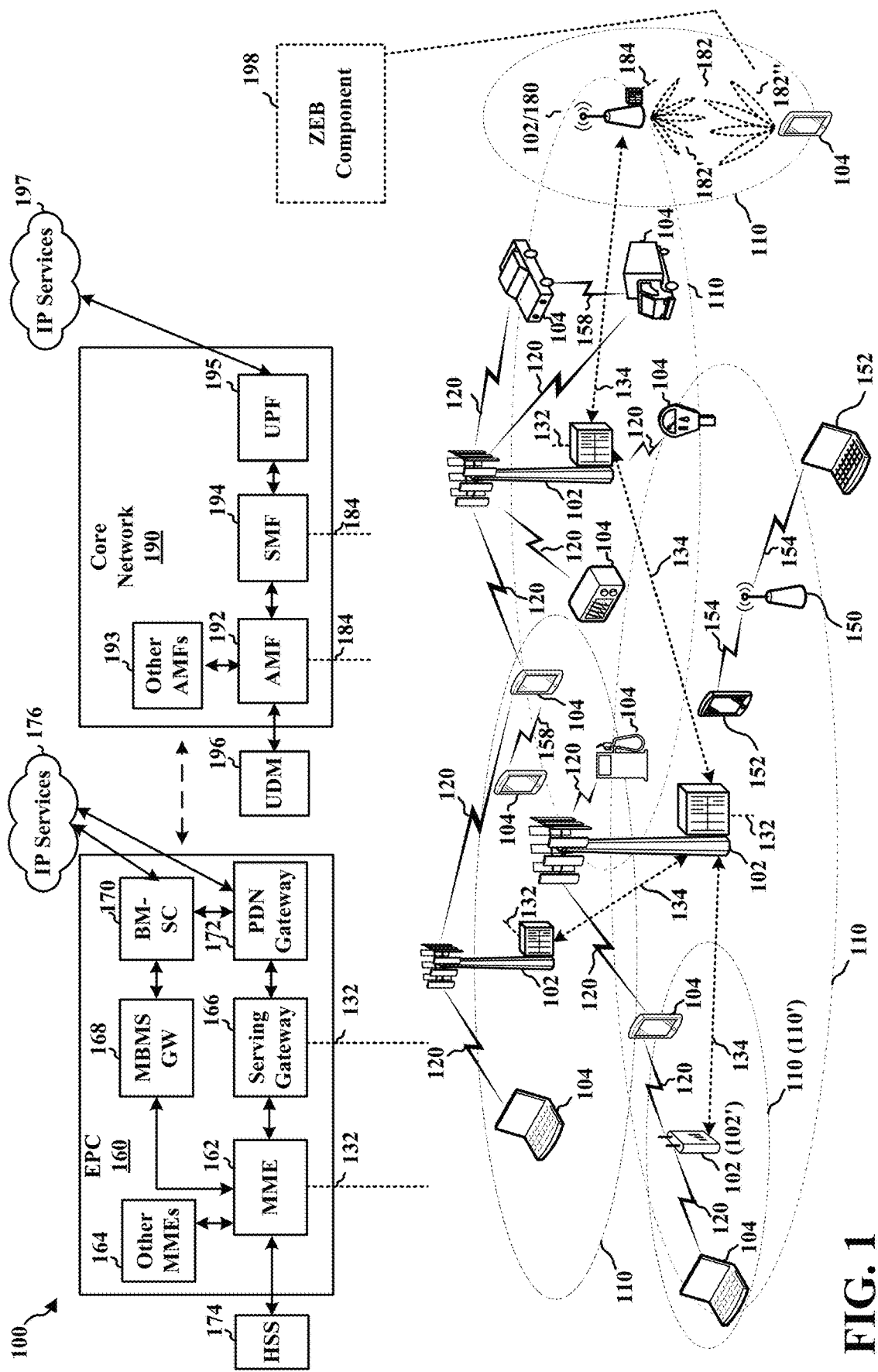
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Radio frequency (RF) power consumption for millimeter wave (mmW) transmissions may, in some cases, be around 75 percent of an overall power consumption of a user equipment (UE). For example, when the UE performs a cell search, the UE may monitor for synchronization signal blocks (SSBs) included in each of a plurality of beams/beam directions transmitted from a base station to measure a detected strength of the SSBs. Based on the cell search, the UE may determine that a first subset of beams was received with a threshold signal strength, that a second subset of beams was received with less than the threshold signal strength, and/or that a third subset of beams was not received/detected by the UE. Hence, the UE may be configured to activate a power saving mode for a mmW module when operations of the mmW module are not to be performed, and deactivate the power saving mode when operations of the mmW module are to be performed.

An SSB may be four symbols in duration. However, some search and measurement procedures may be based on monitoring less than four symbols per SSB. In order to reduce RF power consumption at a symbol level, the UE may apply a zero element beam (ZEB) to one or more symbols of the four SSB symbols that do not need to be monitored by the UE (e.g., based on the search and/or measurement procedure being performed). Application of the ZEB at the symbol level may provide reduced power consumption in comparison to an active search/measurement procedure of the UE on all four symbols of the SSB. In instance where an SSB was not received/detected during the cell search, the UE may be configured in the low power mode for an entirety of the four symbol duration of the SSB. By applying the ZEB to all four of the SSB symbols, the UE may not receive information on the SSB symbols. After the ZEB is applied to one or more symbols of an SSB, the UE may "wake up" within a cyclic prefix (CP) duration for a next active search/measurement operation.

Accordingly, the UE may determine from the cell search whether an SSB was detected in a particular beam direction and, if an SSB was detected, the UE may apply a beam to a subset of the four SSB symbols of the detected SSB, and utilize a ZEB for the SSB symbols that are outside the subset and do not need to be monitored by the UE. If an SSB was not detected during the cell search, the UE may apply the ZEB to all four symbols of the SSB. Application of the ZEB on a symbol level may provide a power savings in comparison to techniques where all four symbols of the SSB are monitored and measured.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in mmW frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a ZEB component 198 configured to determine to measure a set of SSBs. Each SSB of the set of SSBs may be at least four symbols in duration. The ZEB component may determine a subset of SSBs of the set of SSBs for which less than the four symbols associated with the SSBs are to be used for measurement of the SSBs, and measure each SSB of the subset through less than the four symbols associated with the SSB. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu=0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2^\mu$ slots/subframe. The subcarrier spacing and symbol length/duration are a function of the numerology. The subcarrier spacing may be equal to $2^\mu*15$ kHz, where y is the numerology 0 to 5. As such, the numerology $\mu=0$ has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
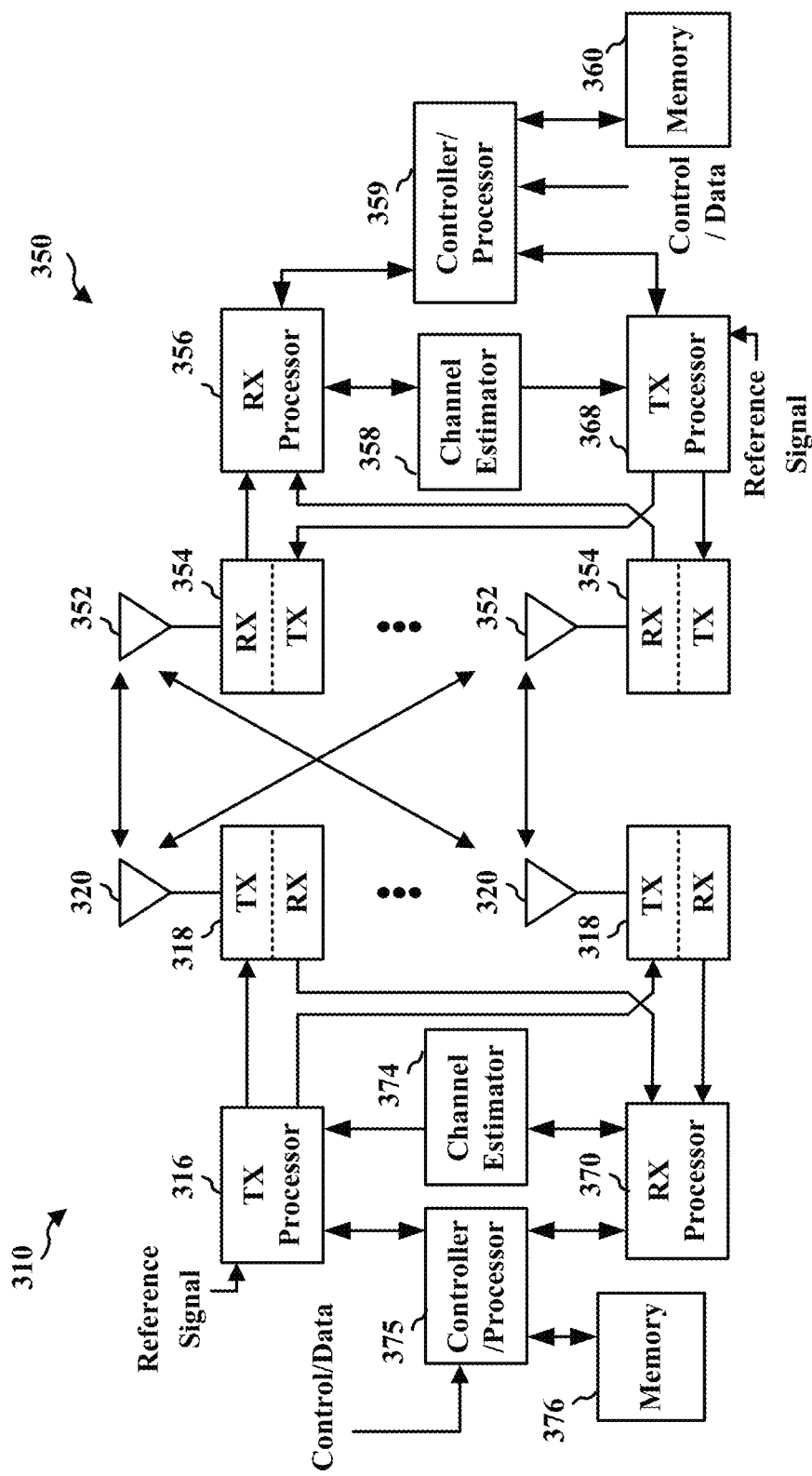
FIG. 3 is a diagram illustrating an example of a user equipment (UE) and a base station in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, or the controller/processor 359 may be configured to perform aspects in connection with the ZEB component 198 of FIG. 1. For example, the TX processor 368, the RX processor 356, and/or the controller/processor 359 may execute instructions stored in memory 360 to perform the aspects associated with the ZEB component 198. Any of the TX processor 368, the RX processor 356, the controller/processor 359, the memory 360, the channel estimator 358, the receivers 354RX, the transmitters 354TX, and respective antennas 352 may be included in the UE 902 of FIG. 9 and/or the apparatus 1102 of FIG. 11. At least one of the TX processor 316, the RX processor 370, or the controller/processor 375 may be configured to perform aspects in connection with the base station 904 of FIG. 9. Any of the TX processor 316, the RX processor 370, the controller/processor 375, the memory 376, the channel estimator 374, the receivers 318RX, the transmitters 318TX, and respective antennas 320 may be included in the base station 904 of FIG. 9.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
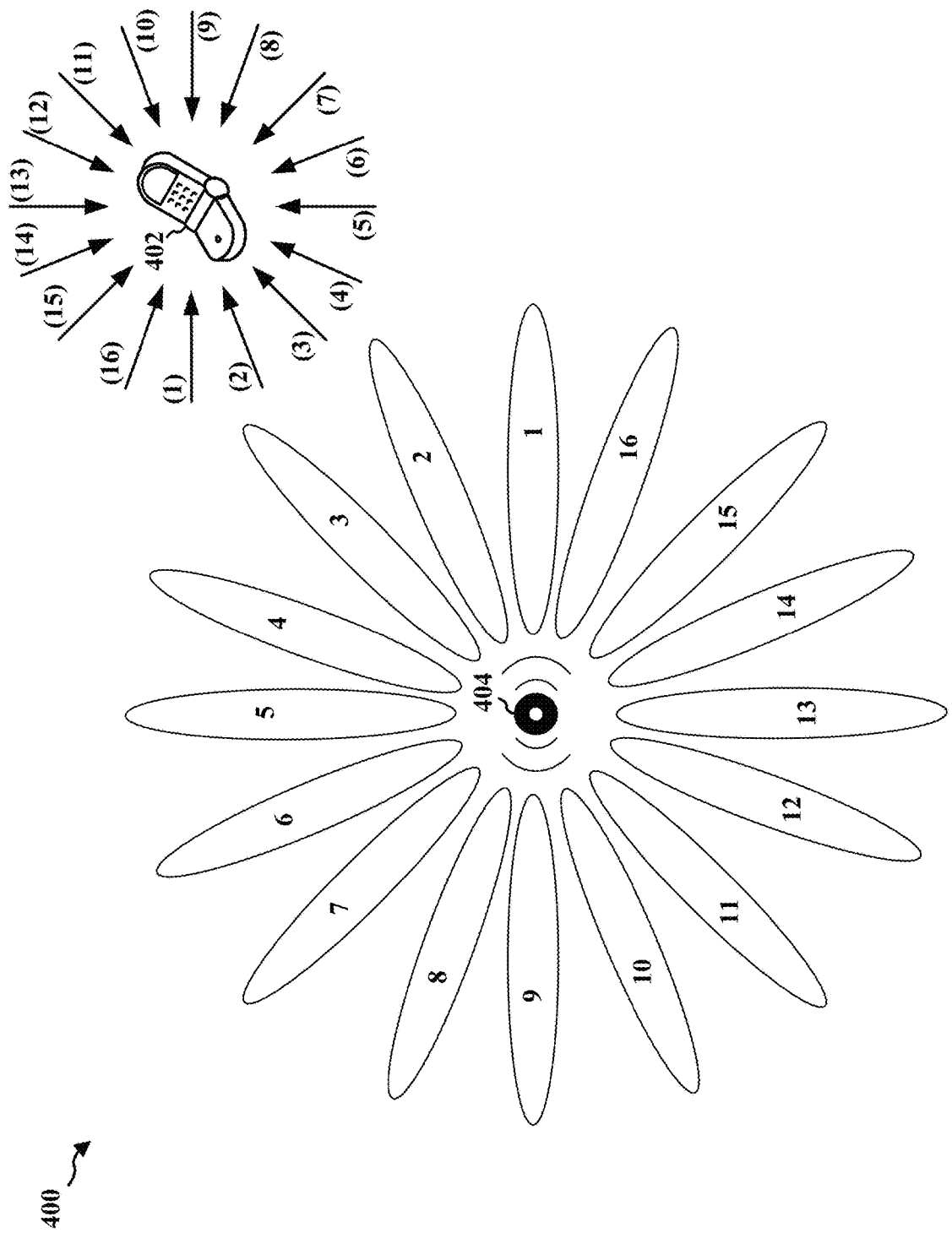
FIG. 4 is a diagram illustrating a plurality of beams transmitted from a base station that correspond to a respective SSB.

FIG. 4 is a diagram 400 illustrating a plurality of beams 1-16 transmitted from a base station 404, where each beam includes a SSB. Increased RF power consumption by a UE 402 may occur in 5G mmW procedures over other procedures, such as LTE procedures. For instance, RF power consumption for mmW transmissions may correspond to 75 percent of an overall power consumption by the UE 402, compared to 30 percent, for example, for LTE transmissions. Thus, due to an amount of power consumed by operations of a mmW module, the UE 402 may determine to activate a power saving mode for the mmW module when operations of the mmW module are not to be performed, and deactivate the power saving mode for the mmW module when operations of the mmW module are to be performed.

The base station 404 may transmit the plurality of beams 1-16 in a plurality of directions about the base station 404 based on beamforming techniques. While the diagram 400 illustrates 16 equally-spaced beams, more or less beams (e.g., either equally-spaced or unequally-spaced) may be transmitted about the base station 404. Each of the plurality of beams 1-16 may include a SSB. The SSB may be four symbols in duration and may further include a PSS, a PBCH, a SSS, and a PBCH that respectively correspond to the four symbols of the SSB.

When the UE 402 performs a cell search, the UE 402 may monitor for SSBs corresponding to the plurality of beams 1-16 and measure a detected strength of the SSBs in each of the plurality of directions. That is, the UE 402 may listen for the SSBs on 16 Rx directions (1)-(16) corresponding to the 16 plurality of beams 1-16 and report reception information for each beam to the base station 404. For example, the UE 402 may determine that beams 2-3 were received with a threshold signal strength, that beams 1 and 4 were received with less than the threshold signal strength (e.g., poor signal strength), and/or that beams 5-16 (e.g., not transmitted substantially toward the UE 402) were not received/detected by the UE 402.

The UE 402 may perform a cell search to determine the cell corresponding to the base station 404 by listening for SSBs in any of the 16 directions. The base station 404 may cycle through 16 Tx directions concurrently with the UE 402 cycling through the 16 Rx directions (1)-(16). For example, beam 1 may be transmitted by the base station 404 16 times in a row concurrently with the UE 402 cycling through each of the 16 Rx directions (1)-(16) (e.g., one after the other) in order for the UE 402 to identify an Rx direction that matches/corresponds to beam 1. A same procedure may be repeated for each of the remaining beams 2-16 and directions (2)-(16).

If the UE 402 is configured to listen for only 1 Rx direction (e.g., the Rx direction (3) corresponding to beam 3), the base station 404 may cycle through the plurality of beams 1-16 via single transmissions of beams 1-16 that occur one after the other. In aspects where the UE 402 listens for each transmission of the plurality of beams 1-16, the UE 402 may measure a corresponding signal strength of each beam and report the corresponding signal strength to the base station 404. In this manner, some of the beams 1-16 that the UE 402 listens for may be determined to have no detected signal strength, as such beams may be undetected by the UE 402.

Accordingly, the UE 402 may search for the transmitted beams based on a time-varying wireless channel and measure a detected signal strength of the transmitted beams in each of the Rx directions (1)-(16). While SSBs may be used for both search and measurement procedures, the UE 402 may not have to monitor for all 4 symbols per SSB in every search and measurement case. The UE 402 may be configured in a low power mode for symbols that are not used for search and/or measurement procedures of the UE 402. Further, for SSBs included in the plurality of beams 1-16 that are not detected by the UE 402 (e.g., due to poor scattering in a mmW channel), the UE 402 may be configured in the low power mode for an entirety of the SSB symbol duration/beam transmission.

FIG. 5 is a table 500 that illustrates RF power consumption for power modes of a UE. In order to conserve RF power at a symbol level, a ZEB may be utilized for one or more symbols of an SSB, which may be 4 symbols in duration. The ZEB may provide reduced power consumption in comparison to an active search/measurement of the UE, which may be based on a 4-element beam. After the ZEB is applied to the one or more symbols, the UE may be configured to "wake up" within a CP duration of a next active search/measurement operation.

The table 500 illustrates that applying the ZEB based on the CP interval for SSB search and measurement operations may provide a power consumption that is roughly 12.2 percent of the power consumption that may be otherwise observed based on operating modes that do not apply the ZEB (e.g., 23 mA power consumption compared to 188.4 mA power consumption). As such, the ZEB may be applied to conserve power at the symbol level for different configurations associated with SSB measurement timing configuration (SMTC) and/or connected-mode discontinuous reception (CDRX).

FIG. 6 is a table 600 illustrating application of the ZEB in association with SMTC and CDRX. In aspects, determining a search window and an SSB bitmap may be performed prior to performing the search and measurement operation of the UE. The UE may determine parameters associated with SSBs of a serving cell, SSBs of a neighbor cell, the SMTC, etc., to determine the search window and the SSB bitmap. In examples, the SMTC may be associated with a time-domain window having a corresponding duration and location for the UE to detect and measure cells within the time-domain window.

The CDRX may be used for signal-free transitions between "sleep" and "awaken" states of the UE. Without CDRX, the UE may have to otherwise be in a continuously awaken state in order to decode DL data that may be received at an undetermined time. For example, without CDRX the UE may consume excess power by monitoring for PDCCH in every subframe to determine whether the subframes includes any DL data. Thus, implementation of the CDRX allows the PDCCH to be discontinuously received, which may reduce the power consumption of the UE.

When the UE is configured with the SMTC and with the CDRX-on/connected without the CDRX, the ZEB may be applied to unused SSB symbols of the SSB bitmap. That is, in configurations where there is no UL/DL data associated with any subcarriers of a same SSB symbol, the UE may apply the ZEB to the unused SSB symbol without impacting other data transmissions. However, if a non-SMTC is used, other subcarriers may be frequency division multiplexed (FDMed) such that UL/DL data may be included in the same symbol as that which may be unused for the SSB. Thus, the ZEB may not be applied to such symbol, as other UL/DL data may be associated with subcarriers of the symbol. When the UE is configured with the CDRX-off, no UL/DL data may be communicated on the subcarriers and, thus, the ZEB may be applied to the unused SSB symbols.

Accordingly, table 600 indicates that if UL/DL data is being communicated on subcarriers of the SSB symbols, the UE may continue to monitor for the SSBs on the corresponding symbols. However, if no UL/DL data is being communicated on the subcarriers of the SSB symbols, the ZEB may be applied to the unused SSB symbols, such that the UE may receive information on the other SSB symbols. For example, the UE may receive information on a subset of the SSB symbols.

Figure 7:
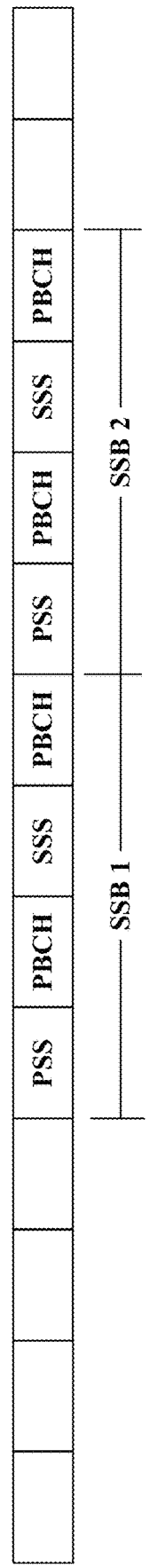
FIG. 7 includes a table indicative of criteria for applying a ZEB to SSB symbols of an exemplary slot.

FIG. 7 includes a table 700 indicative of criteria for applying the ZEB to SSB symbols of an exemplary slot 750. The slot 750 may include two SSBs based on a subcarrier spacing (SCS) of 120 kHz. Each SSB may include 4 symbols. A first column of table 700 indicates a plurality of use cases for applying the ZEB and a second column of table 700 indicates a type/number of symbols per SSB that may be used for the respective use cases. For example, a cell search may utilize all 4 symbols of the SSB (e.g., the PSS, PBCH, SSS, and PBCH), which may thereby exclude application of the ZEB from such cases.

Other use cases may utilize a subset of the SSB symbols, which may allow application of the ZEB on unused symbols outside the subset of SSB symbols. For example, serving cell only measurements, which may include radio link monitoring (RLM)/beam failure detection (BFD) tracking, may be based on 1 of the 4 SSB symbols (e.g., the 1 symbol that includes the SSS). The remaining 3 SSB symbols (e.g., the PSS, the PBCH, and the PBCH) for the serving cell only measurement may have the ZEB applied thereto. In further examples, such as for a neighbor cell measurement and/or a time tracking loop (TTL)/frequency tracking loop (FTL)/ automatic gain control (AGC) loop, 3 of the SSB symbols may be utilized (e.g., the PBCH, the SSS, and the PBCH) and the remaining 1 SSB symbol (e.g., the 1 symbol that includes the PSS) may have the ZEB applied thereto. Because both time and frequency may have to be synchronized for operations of the UE, the TTL/FTL/AGC loops may be executed from time-to-time to ensure synchronization of time and frequency parameters.

In still further use cases, undetected SSBs may utilize 0 SSB symbols and may, therefore, have the ZEB applied to all 4 symbols of the SSB. By applying the ZEB to all the SSB symbols, the UE may no longer receive information on the SSB symbols. Application of the ZEB to all 4 SSB symbols may provide a significant power savings in comparison to other techniques where symbols of the SSB may continue to be measured even when beams/SSBs from the base station are undetected by the UE during a cell search. Accordingly, the UE may determine from the cell search whether an SSB is detected and, if an SSB is detected, the UE may apply a beam to a subset of the SSB symbols corresponding to the detected SSB (e.g., a subset of symbols as indicated via the table 700), and use a ZEB for the SSB symbols that are outside the subset of SSB symbols corresponding to the detected SSB.

FIG. 8 is a table 800 that illustrates RF power consumption corresponding to a number of measured SSB symbols. In an example where 16 SSBs are detected in 1 ms, 64 symbols may be determined as a baseline number of symbols for the 1 ms duration (e.g., 4 symbols/SSB x 16 SSBs). In cases where the UE is configured to measure all 64 symbols of the baseline number of symbols, the RF power consumption may correspond to 107.66 mA. Measuring all the symbols of the baseline may be associated with the ZEB not being applied, as the UE may have to apply a beam at all of the 64 symbols.

In aspects where a serving cell only measurement is to be performed on the 16 SSBs, the UE may apply a beam on 1 symbol (e.g., the SSS symbol) of each of the 16 SSBs. Thus, 16 symbols (e.g., the 16 SSS symbols) of the 64 baseline symbols may be measured by the UE. The other 48 symbols of the baseline (e.g., the 3 unused symbols per SSB) may have the ZEB applied to such symbols. By measuring the symbols used for the serving cell only measurement and not the unused SSB symbols, the RF power consumption may be reduced to 36.77 mA (e.g., approximately 34 percent of the RF power consumed for measuring the entire baseline). Power conservation by the UE may be further provided in cases where the UE is configured with CDRX-on.

Detection of all 16 SSS symbols included in the 16 SSBs of the baseline may correspond to non-line-of-sight (NoS) detection (e.g., in environments associated with high scattering). However, given that some mmW environments may not be associated with high scattering, the UE may detect SSBs from the base station based on line-of-sight (LoS) detection. For example, during a cell search the UE may detect 2 SSBs of the 16 SSBs transmitted from the base station. In such cases, if a serving cell only measurement is to be performed, the UE may measure just 2 SSS symbols of the 64 baseline symbols (e.g., the 2 SSS symbols corresponding to the 2 SSBs detected from the cell search). Thus, the RF power consumption may be reduced to 16.10 mA (e.g., approximately 15 percent of the RF power used to measure the entire baseline number of symbols). While measurements of the UE may be associated with detection of 2 SSBs in the foregoing example, a second cell search performed by the UE that results in detection of more or less SSBs from the base station may cause the measurement techniques of the UE to be changed. For example, the measurement techniques of the UE may be associated with a different number of SSBs based on the more or less SSBs detected via the second cell search.

Figure 9:
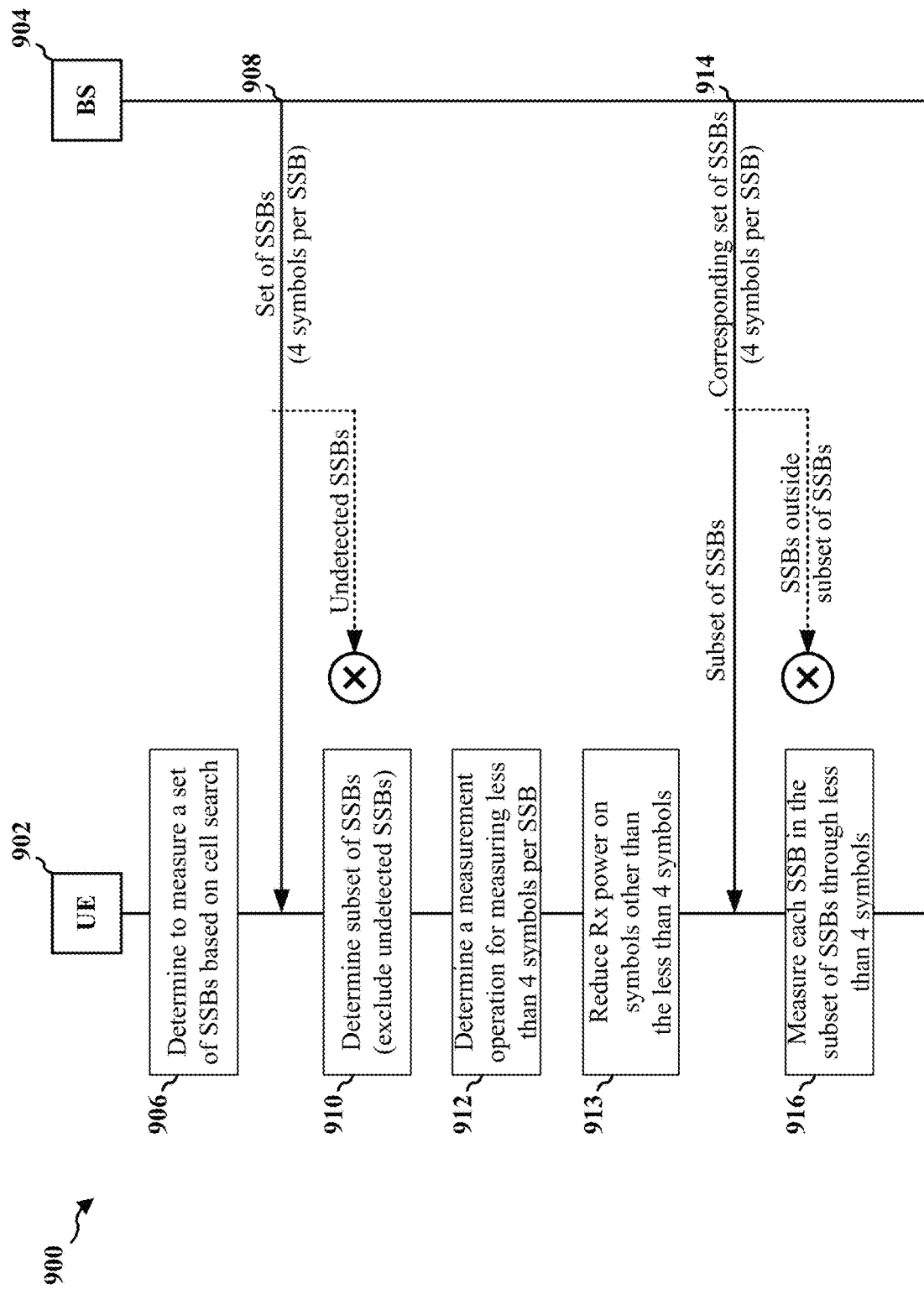
FIG. 9 is a call flow diagram illustrating communications between a UE and a base station.

FIG. 9 is a call flow diagram 900 illustrating communications between a UE 902 and a base station 904. The UE 902 may perform a cell search for a cell that corresponds to the base station 904. At 906, the UE 902 may determine, based on the cell search, to measure a set of SSBs included in a plurality of beams transmitted from the base station 904 in a plurality of directions. At 908, the base station 904 may transmit the set of SSBs in the plurality of directions. Each SSB in the set of SSBs may be at least 4 symbols in duration. The UE 902 may receive one or more SSBs in the set of SSBs. In aspects, other SSBs in the set of SSBs may be undetected/not received by the UE 902.

At 910, the UE 902 may determine a subset of SSBs that were received in the set of SSBs transmitted from the base station 904. The UE 902 may determine the subset of SSBs based on exclusion of the undetected SSBs from the set of SSBs. At 912, the UE 902 may determine to perform a subsequent measurement operation that is based on measuring less than 4 symbols per SSB. For example, a serving cell measurement may be performed based on measuring 1 symbol per SSB, a neighbor cell measurement may be performed based on measuring 3 symbols per SSB, a TTL/ FTL/AGC loop measurement may also be performed based on measuring 3 symbols per SSB, etc. At 913, the UE 902 may reduce a Rx power on symbols other than the less than 4 symbols. For example, the UE 902 may apply a ZEB to the symbols other than the less than 4 symbols.

At 914, the base station 904 may transmit a corresponding set of SSBs associated with the set of SSBs transmitted at 908. Each SSB in the corresponding set of SSBs may likewise be at least 4 symbols in duration. The UE 902 may listen, at 914, for the subset of SSBs in the corresponding set of SSBs based on the determination, at 910, of the subset of SSBs. The UE 902 may not listen for/measure SSBs, at 914-916, that are outside the subset of SSBs. At 916, the UE 902 may measure each SSB received in the subset of SSBs through less than 4 symbols that, for example, correspond to the determined measurement operation at 912.

Figure 10:
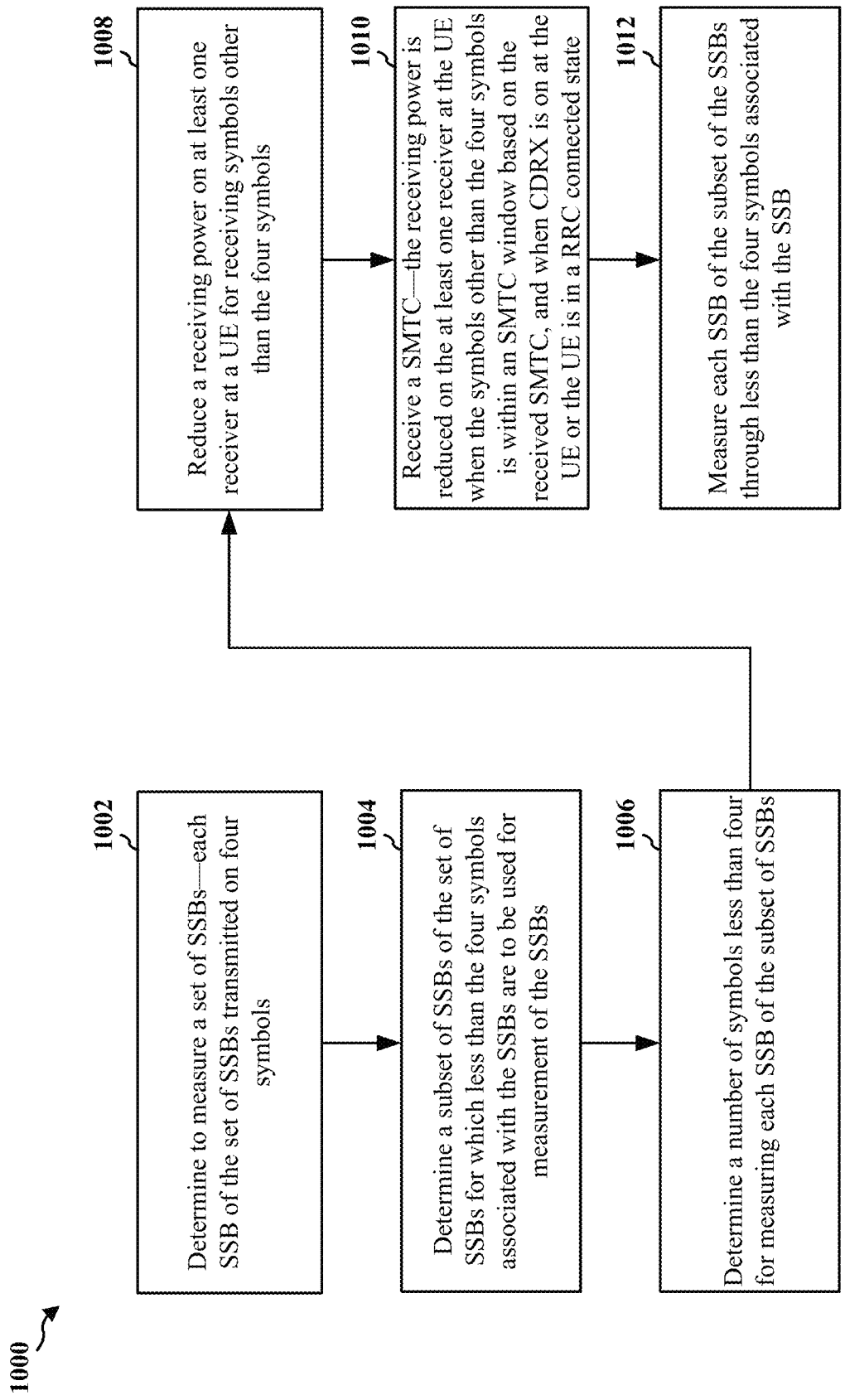
FIG. 10 is a flowchart of a method of wireless communication at a UE.

FIG. 10 is a flowchart 1000 of a method at wireless communication. The method may be performed by a UE (e.g., the UE 402), which may include the memory 360 and which may be the entire UE 402 or a component of the UE 402, such as the TX processor 368, the RX processor 356, and/or the controller/processor 359.

At 1002, the UE may determine to measure a set of SSBs—each SSB of the set of SSBs transmitted on four symbols. For example, referring to FIGS. 4 and 7, the UE 402 may determine to measure a set of SSBs included in the plurality of beams 1-16 transmitted from the base station 404. The exemplary slot 750 includes SSB 1 and SSB 2 (e.g., received from the base station 404, for example, via beams 1-2) that are each transmitted on four symbols. The set of SSBs may be determined to include SSBs associated with a cell search and to exclude SSBs that are undetected based on a cell search. For example, referring to FIG. 4, the UE 402 may perform a cell search for a cell that includes the base station 404, where detected SSBs in one or more of the plurality of beams 1-16 may be included in the set of SSBs and undetected SSBs may be excluded from the set of SSBs.

At 1004, the UE may determine a subset of SSBs of the set of SSBs for which less than the four symbols associated with the SSBs are to be used for measurement of the SSBs. For example, referring to FIGS. 7-8, the UE may perform a serving cell only measurement which, as indicated in the table 700, only requires measurement of the SSS symbol (e.g., in each of SSB 1 and SSB 2 of the exemplary slot 750) and may not require measurement of the other 3 symbols (e.g., in each of SSB 1 and SSB 2). In some configurations, the set of SSBs may include 16 SSBs (e.g., associated with the 16 SSS symbols identified in the table 800 based on the NoS SSB detection) and in a same or different configuration the determined subset of SSBs may include 2 SSBs (e.g., associated with the 2 SSS symbols identified in the table 800 based on the LoS SSB detection).

Determining the subset of the SSBs may include determining that one or more SSBs of the set of SSBs is associated with at least one of a serving cell measurement, a neighbor cell measurement, or at least one of a TTL, a FTL, or an AGC loop. For example, referring to FIG. 7, the table 700 indicates that a serving cell only measurement, a neighbor cell measurement, and/or a TTL/FTL/AGC loop may be associated with an SSB based on various symbols. The subset of the SSBs may be determined to include the determined one or more SSBs associated with the at least one of the serving cell measurement, the neighbor cell measurement, or the at least one of the TTL, the FTL, or the AGC loop. For example, the subset of SSBs may include SSB 1 and SSB 2 of the exemplary slot 750 and may be associated with the use cases of the table 700. For the serving cell only measurement, the one or more SSBs may be measured based on one symbol associated with a SSS (e.g., as indicated via the table 700). For the neighbor cell measurement and/or the TTL/FTL/AGC loop, the one or more SSBs may be measured based on three symbols including two symbols for PBCHs and one symbol for a SSS (e.g., as indicated via the table 700).

At 1006, the UE may determine a number of symbols less than four for measuring each SSB of the subset of SSBs, where each SSB of the set of SSBs is measured based on the determined number of symbols for the SSB. For example, referring to FIG. 7, the UE may determine that some use cases included in the table 700 may be associated with measuring a number of symbols per SSB that is less than four symbols per SSB (e.g., 0-3 symbols per SSB). For SSBs in the subset of SSBs associated with a serving cell measurement, the number of symbols may be one, the one symbol being associated with a SSS (e.g., as indicated via the table 700). For SSBs in the subset of SSBs associated with at least one of a neighbor cell measurement or at least one of a TTL, a FTL, or an AGC loop, the number of symbols may be three, the three symbols including two symbols for PBCHs and one symbol for a SSS (e.g., as indicated via the table 700).

At 1008, the UE may reduce a receiving power on at least one receiver at a UE for receiving symbols other than the four symbols. For example, referring to FIG. 9, the UE 902 may reduce, at 913, the Rx power on symbols other than the less than 4 symbols. The less than the four symbols may include x symbols, where x<4. That is, each SSB of the subset of the SSBs may include a first subset of symbols including the x symbols (e.g., the less than 4 symbols) and a second subset of symbols including remaining symbols of each SSB (e.g., the symbols other than the less than 4 symbols). The remaining symbols may include y symbols, where y=4−x.

At 1010, the UE may receive a SMTC—the receiving power is reduced on the at least one receiver at the UE when the symbols other than the four symbols is within an SMTC window based on the received SMTC, and when CDRX is on at the UE or the UE is in a RRC connected state. For example, referring to FIG. 6, the table 600 indicates that if the UE is configured with the CDRX-on or connected without the CDRX and the UE is also configured with a received SMTC, the ZEB may be applied to unused SSB symbols within an SSB bitmap corresponding to the SMTC. The unused SSB symbols may not be scheduled for receiving anything other than the SSBs in the determined subset of SSBs. Additionally or alternatively, the receiving power may be reduced on the at least one receiver at the UE when CDRX is off at the UE. For example, referring to FIG. 6, the table 600 indicates that if the UE is configured with the CDRX-off, the ZEB may be applied to unused SSB symbols that are not scheduled for receiving anything other than SSBs in the determined subset of SSBs.

At 1012, the UE may measure each SSB of the subset of the SSBs through less than the four symbols associated with the SSB. For example, referring to FIGS. 7-8, the table 800 indicates that 2 SSBs (e.g., a subset of the set of 16 SSBs) may be measured by the UE based on use cases included in the table 700 that correspond to measuring a number of symbols per SSB that is less than four symbols (e.g., 0-3 symbols). The SSBs in the subset of SSBs may be associated with at least one of a serving cell measurement, a neighbor cell measurement, or at least one of a TTL, a FTL, or an AGC loop (e.g., as indicated via the table 700).

Figure 11:
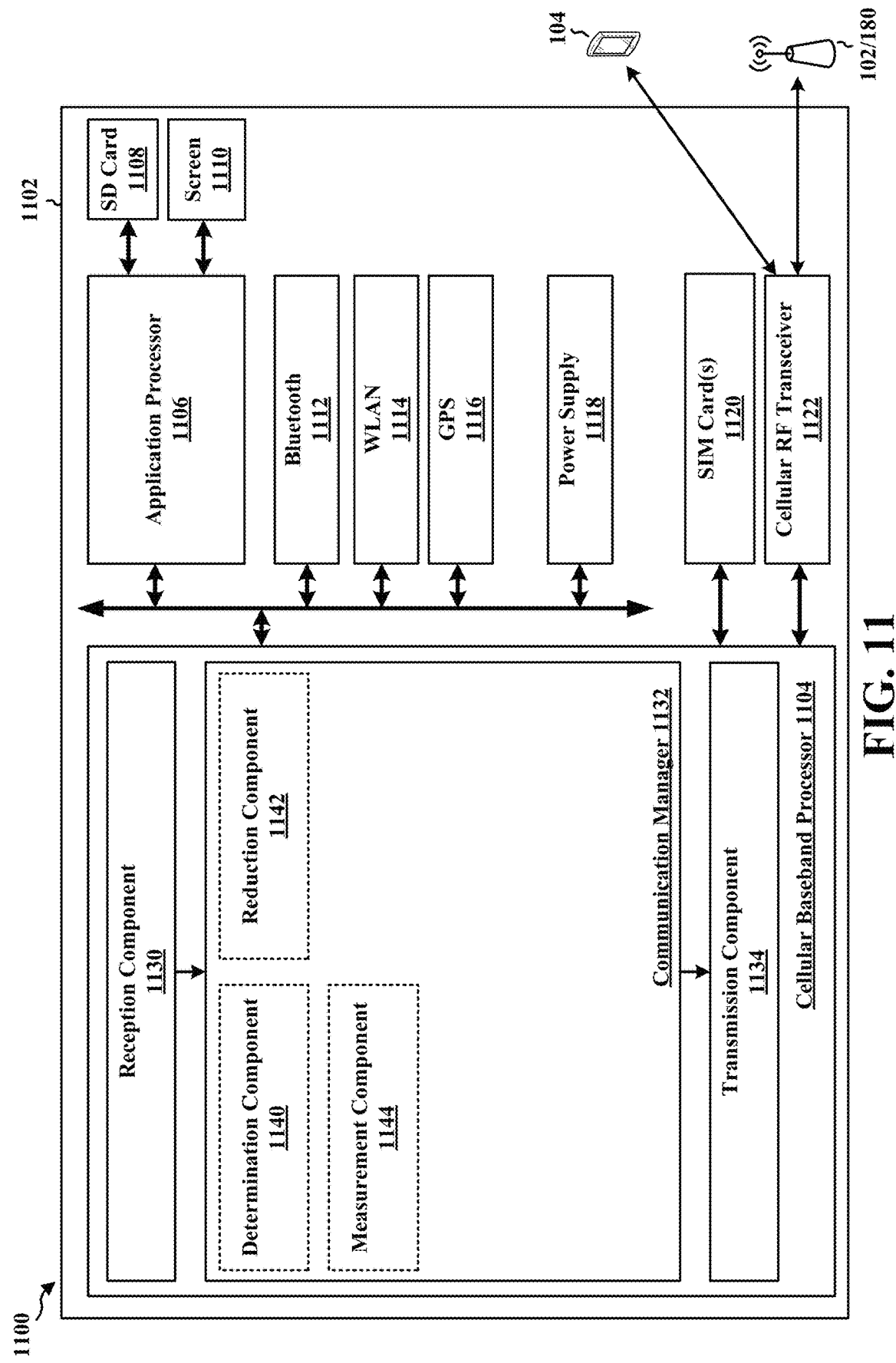
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The reception component 1130 is configured, e.g., as described in connection with 1010, to receive a SMTC—the receiving power is reduced on the at least one receiver at the UE when the symbols other than the four symbols is within an SMTC window based on the received SMTC, and when CDRX is on at the UE or the UE is in a RRC connected state. The communication manager 1132 includes a determination component 1140 that is configured, e.g., as described in connection with 1002, 1004, and 1006, to determine to measure a set of SSBs—each SSB of the set of SSBs transmitted on four symbols; to determine a subset of SSBs of the set of SSBs for which less than the four symbols associated with the SSBs are to be used for measurement of the SSBs; and to determine a number of symbols less than four for measuring each SSB of the subset of SSBs. The communication manager 1132 further includes a reduction component 1142 that is configured, e.g., as described in connection with 1008, to reduce a receiving power on at least one receiver at a UE for receiving symbols other than the four symbols. The communication manager 1132 further includes a measurement component 1144 that is configured, e.g., as described in connection with 1012, to measure each SSB of the subset of the SSBs through less than the four symbols associated with the SSB.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for determining to measure a set of SSBs, each SSB of the set of SSBs transmitted on four symbols; means for determining a subset of SSBs of the set of SSBs for which less than the four symbols associated with the SSBs are to be used for measurement of the SSBs; and means for measuring each SSB of the subset of the SSBs through less than the four symbols associated with the SSB. The apparatus 1102 further includes means for reducing a receiving power on at least one receiver at the UE for receiving symbols within the second subset of symbols. The apparatus 1102 further includes means for receiving an SMTC, wherein the receiving power is reduced on the at least one receiver at the UE when the second subset of symbols is within an SMTC window based on the received SMTC, and when CDRX is on at the UE or the UE is in a RRC connected state. The apparatus 1102 further includes means for determining a number of symbols less than four for measuring each SSB of the subset of SSBs, wherein each SSB of the set of SSBs is measured based on the determined number of symbols for the SSB.

In a first aspect, the means for determining the subset of the SSBs is further configured to determine that one or more SSBs of the set of SSBs is associated with a serving cell measurement, where the subset of the SSBs is determined to include the determined one or more SSBs associated with the serving cell measurement, and where the one or more SSBs are measured based on one symbol associated with a SSS. In a second aspect, the means for determining the subset of the SSBs is further configured to determine that one or more SSBs of the set of SSBs is associated with a neighbor cell measurement, where the subset of the SSBs is determined to include the determined one or more SSBs associated with the neighbor cell measurement, and where the one or more SSBs are measured based on three symbols including two symbols for PBCHs and one symbol for a SSS. In a third aspect, the means for determining the subset of the SSBs is further configured to determine that one or more SSBs of the set of SSBs is associated with at least one of a TTL, a FTL, or an AGC loop, where the subset of the SSBs is determined to include the determined one or more SSBs associated with the at least one of the TTL, FTL, or AGC, and where the one or more SSBs are measured based on three symbols including two symbols for PBCHs and one symbol for a SSS.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, after the UE performs a cell search for a set of SSBs, the UE may determine a subset of the set of SSBs that is detected from the cell search. For subsequent measurement operations, the UE may conserve power by listening for/measuring only the SSBs that correspond to the subset of SSBs detected from the cell search and applying a ZEB to the SSBs that correspond to undetected SSBs from the cell search (e.g., SSBs that are outside the subset). Each SSB measured by the UE may extend across four symbols. The UE may further determine based on a type of measurement operation to be performed that less than four symbols of an SSB may need to be measured. The UE may additionally conserve power by measuring less than four symbols of the SSB in the subset of SSBs based on the type of measurement operation, and apply the ZEB to the reaming symbol(s) of each SSB in the subset of SSBs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, comprising: determining to measure a set of SSBs, each SSB of the set of SSBs transmitted on four symbols; determining a subset of SSBs of the set of SSBs for which less than the four symbols associated with the SSBs are to be used for measurement of the SSBs; and measuring each SSB of the subset of the SSBs through less than the four symbols associated with the SSB.

Aspect 2 may be combined with aspect 1 and includes that the set of SSBs are determined to include SSBs associated with a cell search and to exclude SSBs that are undetected based on a cell search.

Aspect 3 may be combined with any of aspects 1-2 and includes that the SSBs in the subset of SSBs are associated with at least one of: a serving cell measurement; a neighbor cell measurement; or at least one of a TTL, a FTL, or an AGC loop.

Aspect 4 may be combined with any of aspects 1-3 and includes that the less than the four symbols comprises x symbols, where x<4, each SSB of the subset of the SSBs includes a first subset of symbols including the x symbols and a second subset of symbols including remaining symbols of each SSB, the remaining symbols including y symbols, where y=4−x.

Aspect 5 may be combined with any of aspects 1-4 and further includes reducing a receiving power on at least one receiver at the UE for receiving symbols within the second subset of symbols.

Aspect 6 may be combined with any of aspects 1-5 and includes that the receiving power is reduced on the at least one receiver at the UE when CDRX is off at the UE.

Aspect 7 may be combined with any of aspects 1-5 and further includes receiving an SMTC, wherein the receiving power is reduced on the at least one receiver at the UE when the second subset of symbols is within an SMTC window based on the received SMTC, and when CDRX is on at the UE or the UE is in a RRC connected state.

Aspect 8 may be combined with any of aspects 1-7 and further includes determining a number of symbols less than four for measuring each SSB of the subset of SSBs, wherein each SSB of the set of SSBs is measured based on the determined number of symbols for the SSB.

Aspect 9 may be combined with any of aspects 1-8 and includes that for SSBs in the subset of SSBs associated with a serving cell measurement, the number of symbols is one, the one symbol including a SSS; for SSBs in the subset of SSBs associated with a neighbor cell measurement, the number of symbols is three, the three symbols including two symbols for PBCHs and one symbol for the SSS; or for SSBs in the subset of SSBs associated with at least one of a TTL, a FTL, or an AGC loop, the number of symbols is three, the three symbols including two symbols for the PBCHs and one symbol for the SSS.

Aspect 10 may be combined with any of aspects 1-9 and includes that the determining the subset of the SSBs comprises determining that one or more SSBs of the set of SSBs is associated with a serving cell measurement, wherein the subset of the SSBs is determined to include the determined one or more SSBs associated with the serving cell measurement, and wherein the one or more SSBs are measured based on one symbol associated with a SSS.

Aspect 11 may be combined with any of aspects 1-9 and includes that the determining the subset of the SSBs comprises determining that one or more SSBs of the set of SSBs is associated with a neighbor cell measurement, wherein the subset of the SSBs is determined to include the determined one or more SSBs associated with the neighbor cell measurement, and wherein the one or more SSBs are measured based on three symbols including two symbols for PBCHs and one symbol for a SSS.

Aspect 12 may be combined with any of aspects 1-9 and includes that the determining the subset of the SSBs comprises determining that one or more SSBs of the set of SSBs is associated with at least one of a TTL, a FTL, or an AGC loop, wherein the subset of the SSBs is determined to include the determined one or more SSBs associated with the at least one of the TTL, FTL, or AGC, and wherein the one or more SSBs are measured based on three symbols including two symbols for PBCHs and one symbol for a SSS.

Aspect 13 is an apparatus for wireless communication including at least one processor coupled to a memory and configured to implement a method as in any of aspects 1-12.

Aspect 14 is an apparatus for wireless communication including means for implementing a method as in any of aspects 1-12.

Aspect 15 is a computer-readable medium storing computer executable code, the code when executed by at least one processor causes the at least one processor to implement a method as in any of aspects 1-12.

What is claimed is:

1. A method of wireless communication of a user equipment (UE), comprising:
  receiving a set of synchronization signal blocks (SSBs), each SSB of the set of SSBs transmitted on four symbols, wherein each SSB of the set of SSBs is transmitted on a respective beam;
  determining a subset of SSBs of the set of SSBs for which less than the four symbols associated with the SSBs are to be used for measurement of the SSBs;
  applying a zero-element beam (ZEB) to remaining symbols other than the less than the four symbols of each SSB in the subset of SSBs, wherein applying the ZEB reduces a receiving power on at least one receiver at the UE for a reception of the remaining symbols of each SSB in the subset of SSBs; and when the less than the four symbols is greater than zero, measuring each SSB of the subset of SSBs through the less than the four symbols associated with the SSB.

2. The method of claim 1, wherein the set of SSBs are determined to include SSBs associated with a cell search and to exclude SSBs that are undetected based on the cell search.

3. The method of claim 1, wherein the SSBs in the subset of SSBs are associated with at least one of:
a serving cell measurement;
a neighbor cell measurement; or
at least one of a time tracking loop (TTL), a frequency tracking loop (FTL), or an automatic gain control (AGC) loop.

4. The method of claim 1, wherein the less than the four symbols comprises x symbols, where x<4, each SSB of the subset of the SSBs includes a first subset of symbols including the x symbols and a second subset of symbols including the remaining symbols of each SSB, the remaining symbols including y symbols, where y=4−x.

5. The method of claim 1, wherein the receiving power is reduced on the at least one receiver at the UE when connected mode discontinuous reception (CDRX) is off at the UE.

6. The method of claim 1, further comprising receiving an SSB measurement timing configuration (SMTC), wherein the receiving power is reduced on the at least one receiver at the UE when a second subset of symbols is within an SMTC window based on the received SMTC and when connected mode discontinuous reception (CDRX) is on at the UE or the UE is in a radio resource control (RRC) connected state.

7. The method of claim 1, further comprising determining a number of symbols less than four for measuring each SSB of the subset of SSBs, wherein each SSB of the set of SSBs is measured based on the determined number of symbols for the SSB.

8. The method of claim 7, wherein:
for SSBs in the subset of SSBs associated with a serving cell measurement, the number of symbols is one, the one symbol including a secondary synchronization signal (SSS);
for SSBs in the subset of SSBs associated with a neighbor cell measurement, the number of symbols is three, the three symbols including two symbols for physical broadcast channels (PBCHs) and one symbol for the SSS; or
for SSBs in the subset of SSBs associated with at least one of a time tracking loop (TTL), a frequency tracking loop (FTL), or an automatic gain control (AGC) loop, the number of symbols is three, the three symbols including the two symbols for the PBCHs and the one symbol for the SSS.

9. The method of claim 1, wherein determining the subset of the SSBs comprises determining that one or more SSBs of the set of SSBs are associated with a serving cell measurement, wherein the subset of the SSBs includes the determined one or more SSBs associated with the serving cell measurement, and wherein the one or more SSBs are measured based on one symbol associated with a secondary synchronization signal (SSS).

10. The method of claim 1, wherein determining the subset of the SSBs comprises determining that one or more SSBs of the set of SSBs are associated with a neighbor cell measurement, wherein the subset of the SSBs includes the determined one or more SSBs associated with the neighbor cell measurement, and wherein the one or more SSBs are measured based on three symbols including two symbols for physical broadcast channels (PBCHs) and one symbol for a secondary synchronization signal (SSS).

11. The method of claim 1, wherein determining the subset of the SSBs comprises determining that one or more SSBs of the set of SSBs is associated with at least one of a time tracking loop (TTL), a frequency tracking loop (FTL), or an automatic gain control (AGC) loop, wherein the subset of the SSBs includes the determined one or more SSBs associated with the at least one of the TTL, the FTL, or the AGC, and wherein the one or more SSBs are measured based on three symbols including two symbols for physical broadcast channels (PBCHs) and one symbol for a secondary synchronization signal (SSS).

12. An apparatus for wireless communication at a user equipment (UE), comprising:
at least one memory; and
at least one processor coupled to the at least one memory and configured to:
receive a set of synchronization signal blocks (SSBs), each SSB of the set of SSBs transmitted on four symbols, wherein each SSB of the set of SSBs is transmitted on a respective beam;
determine a subset of SSBs of the set of SSBs for which less than the four symbols associated with the SSBs are to be used for measurement of the SSBs;
apply a zero-element beam (ZEB) to remaining symbols other than the less than the four symbols of each SSB in the subset of SSBs, wherein to apply the ZEB, the at least one processor is configured to reduce a receiving power on at least one receiver at the UE for a reception of the remaining symbols of each SSB in the subset of SSBs; and
when the less than four symbols is greater than zero, measure each SSB of the subset of SSBs through the less than the four symbols associated with the SSB.

13. The apparatus of claim 12, wherein to determine to measure the set of SSBs, the at least one processor is configured to determine the set of SSBs to include SSBs associated with a cell search and to exclude SSBs that are undetected based on the cell search.

14. The apparatus of claim 12, wherein the SSBs in the subset of SSBs are associated with at least one of:
a serving cell measurement;
a neighbor cell measurement; or
at least one of a time tracking loop (TTL), a frequency tracking loop (FTL), or an automatic gain control (AGC) loop.

15. The apparatus of claim 12, wherein the less than the four symbols comprises x symbols, where x<4, each SSB of the subset of the SSBs includes a first subset of symbols including the x symbols and a second subset of symbols including the remaining symbols of each SSB, the remaining symbols including y symbols, where y =4−x.

16. The apparatus of claim 12, wherein to reduce the receiving power, the at least one processor is configured to reduce the receiving power on the at least one receiver at the UE when connected mode discontinuous reception (CDRX) is off at the UE.

17. The apparatus of claim 12, wherein the at least one processor is further configured to receive an SSB measurement timing configuration (SMTC), wherein to reduce the receiving power, the at least one processor is configured to reduce the receiving power on the at least one receiver at the UE when a second subset of symbols is within an SMTC window based on the received SMTC and when connected mode discontinuous reception (CDRX) is on at the UE or the UE is in a radio resource control (RRC) connected state.

18. The apparatus of claim 12, wherein the at least one processor is further configured to determine a number of symbols less than four for measuring each SSB of the subset of SSBs, wherein to measure each SSB of the set of SSBs, the at least one processor is configured to measure each SSB of the set of SSBs based on the determined number of symbols for the SSB.

19. The apparatus of claim 18, wherein:
for SSBs in the subset of SSBs associated with a serving cell measurement, the number of symbols is one, the one symbol including a secondary synchronization signal (SSS);
for SSBs in the subset of SSBs associated with a neighbor cell measurement, the number of symbols is three, the three symbols including two symbols for physical broadcast channels (PBCHs) and one symbol for the SSS; or
for SSBs in the subset of SSBs associated with at least one of a time tracking loop (TTL), a frequency tracking loop (FTL), or an automatic gain control (AGC) loop, the number of symbols is three, the three symbols including the two symbols for the PBCHs and the one symbol for the SSS.

20. The apparatus of claim 12, wherein to determine the subset of the SSBs the at least one processor is further configured to determine that one or more SSBs of the set of SSBs are associated with a serving cell measurement, wherein the subset of the SSBs includes the determined one or more SSBs associated with the serving cell measurement, and wherein to measure the one or more SSBs, the at least one processor is configured to measure the one or more SSBs based on one symbol associated with a secondary synchronization signal (SSS).

21. The apparatus of claim 12, wherein to determine the subset of the SSBs the at least one processor is further configured to determine that one or more SSBs of the set of SSBs are associated with a neighbor cell measurement, wherein the subset of the SSBs includes the determined one or more SSBs associated with the neighbor cell measurement, and wherein to measure the one or more SSBs, the at least one processor is configured to measure the one or more SSBs based on three symbols including two symbols for physical broadcast channels (PBCHs) and one symbol for a secondary synchronization signal (SSS).

22. The apparatus of claim 12, wherein to determine the subset of the SSBs the at least one processor is further configured to determine that one or more SSBs of the set of SSBs are associated with at least one of a time tracking loop (TTL), a frequency tracking loop (FTL), or an automatic gain control (AGC) loop, wherein the subset of the SSBs includes the determined one or more SSBs associated with the at least one of the TTL, the FTL, or the AGC, and wherein to measure the one or more SSBs, the at least one processor is configured to measure the one or more SSBs based on three symbols including two symbols for physical broadcast channels (PBCHs) and one symbol for a secondary synchronization signal (SSS).

23. An apparatus for wireless communication at a user equipment (UE), comprising:
means for receiving a set of synchronization signal blocks (SSBs), each SSB of the set of SSBs transmitted on four symbols, wherein each SSB of the set of SSBs is transmitted on a respective beam;
means for determining a subset of SSBs of the set of SSBs for which less than the four symbols associated with the SSBs are to be used for measurement of the SSBs;
means for applying a zero-element beam (ZEB) to remaining symbols other than the less than the four symbols of each SSB in the subset of SSBs, wherein applying the ZEB reduces a receiving power on at least one receiver at the UE for a reception of the remaining symbols of each SSB in the subset of SSBs; and
when the less than four symbols is greater than zero, means for measuring each SSB of the subset of the SSBs through the less than the four symbols associated with the SSB.

24. A non-transitory computer-readable medium storing computer executable code, the code when executed by at least one processor causes the at least one processor to:
receive a set of synchronization signal blocks (SSBs), each SSB of the set of SSBs transmitted on four symbols, wherein each SSB of the set of SSBs is transmitted on a respective beam;
determine a subset of SSBs of the set of SSBs for which less than the four symbols associated with the SSBs are to be used for measurement of the SSBs;
apply a zero-element beam (ZEB) to remaining symbols other than the less than the four symbols of each SSB in the subset of SSBs, wherein applying the ZEB causes the at least one processor to reduce a receiving power on at least one receiver for a reception of the remaining symbols of each SSB in the subset of SSBs; and
when the less than four symbols is greater than zero, measure each SSB of the subset of the SSBs through the less than the four symbols associated with the SSB.

\* \* \* \* \*